Jan. 31, 1961     T. K. HOLMEN     2,969,972
BALANCED LOAD HANGER
Filed Sept. 19, 1958
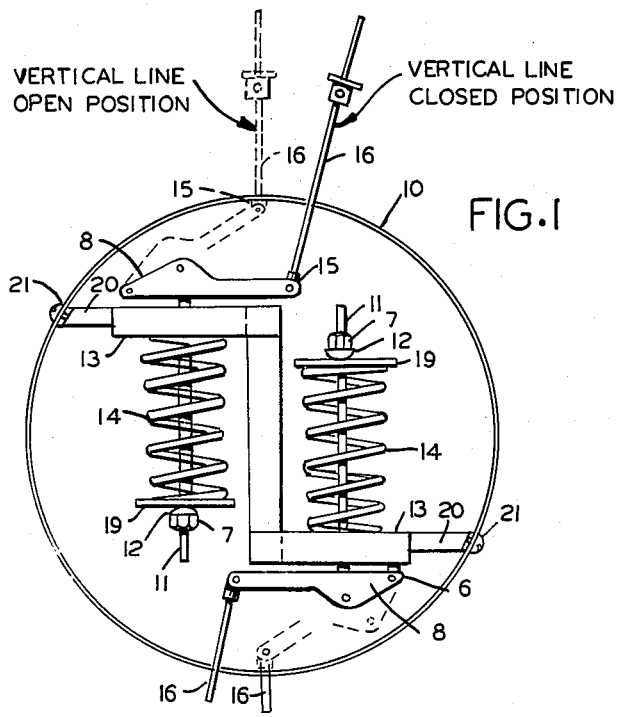
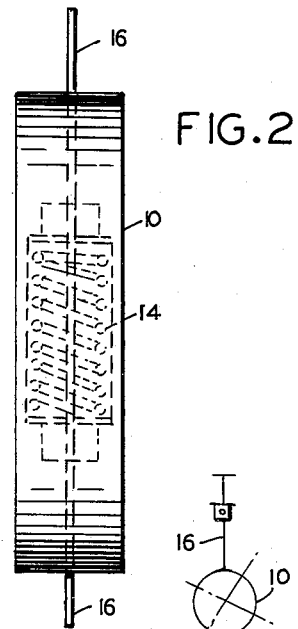
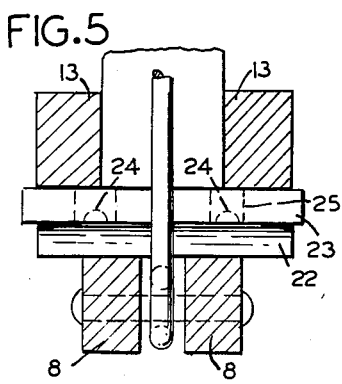
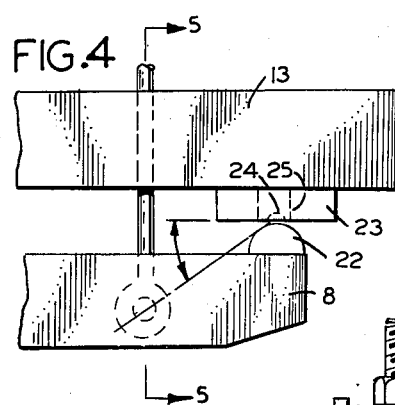
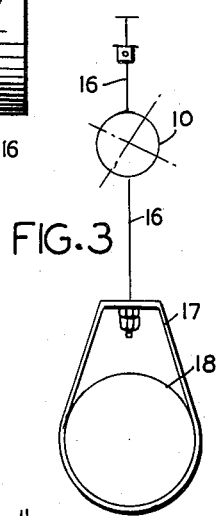
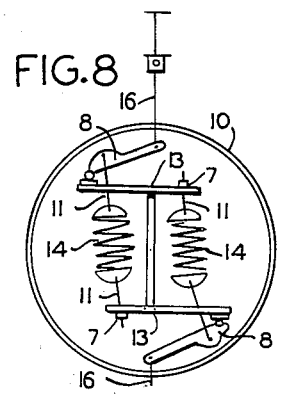
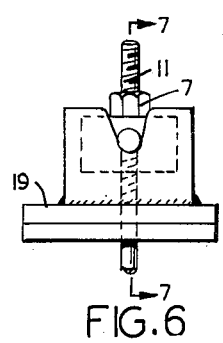
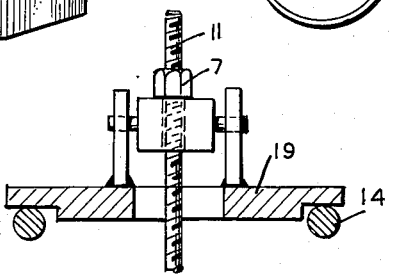
INVENTOR
Torleif K. Holmen
BY *M. Bjorndal*
ATTORNEY

United States Patent Office 2,969,972
Patented Jan. 31, 1961

2,969,972

BALANCED LOAD HANGER

Torleif K. Holmen, Atkinson, N.H., assignor to Grinnell Corporation, Providence, R.I., a corporation of Delaware Filed Sept. 19, 1958, Ser. No. 762,079

3 Claims. (Cl. 267—1)

This invention relates to a new and improved balanced load hanger for furnishing spring support for pipes and other heavy objects subject to motion and specifically it refers to a balanced load hanger for heavy objects subsubject to large motions and where the necessary spring tension may be calculated to balance the load at any point of its travel.

Another object of this invention is to provide a balanced load hanger of simple construction, that can be manufactured at low cost and have an extra long range of travel.

In the accompanying drawing, forming a part of this specification and in which like numbers designate like parts throughout the same, Figure 1 is a front view of the hanger proper, Figure 2 being a side view of the hanger, Figure 3 represents a schematic diagram of the balanced load hanger supporting a pipe, Figure 4 represents a low friction pivot or rocker bearing, Figure 5 represents a section taken along line 5—5 in Figure 4, Figure 6 represents a pivot for link 11 shown as part of plate 19, Figure 7 represents a section through line 7—7 in Figure 6, and, Figure 8 is a view similar to Figure 1 of a modification.

Referring to Figure 1 there are two levers 8 which are pivoted at 6 and rest upon a Z-shaped frame 13 enclosed within a casing 10, one of the levers 8 can swing upwards and the other downwards. There are also two coil springs 14 which rest upon the frame 13.

The one end of each spring is solidly supported on the frame 13, the other end of each spring 14 is free to move and is connected to a lever 8 by a link 11. The free end of each spring carries a cover plate 19 and a spherically shaped washer "Rocker Washer" 12 or a swivel joint as shown in Figure 5. The link 11 is supported centrically on the cover 19 by the washer 12 and nut 7. By taking up nut 7 the spring 14 can be compressed to give the proper and calculated tension to the link 11.

The one end of each lever 8 is pivoted at point 6 and resting on frame structure 13 this pivot or bearing is a non-lubricant low-friction bearing. A simple type of that kind is illustrated in Figure 4.

The other end of each lever 8 is pivoted at a joint 15 which connects rod 16.

The lower rod 16 carries a suitable strap 17 which supports the pipe 18, shown in Figure 3. The upper rod 16 is for hanging the equipment from supporting structure by suitable means.

The rocker point 22 rests upon plate 23 which is fastened to or being part of frame 13, see Figure 4. The plate 23 has two holes or grooves 25. The rocker point 22 is provided with two pins or teeth 24 that fit into the holes 25 thus guiding the rocker point 22 in place and alignment.

The balanced load hanger illustrated schematically in Figure 8 is very similar to the one illustrated in Figure 1 except that the frame is substantially I shaped instead of Z shaped, and except that the spring 14 is of a different type and is under tension while the spring in Figure 1 is under compression.

The operation of my invention is obvious from the preceding description but may be reiterated briefly as follows: The load is predetermined in any particular case by computation or by test. A hanger of the proper capacity is then selected and the nuts 7 on rods 11 are adjusted for proper tension on springs 14.

It is to be understood that the form of my invention herewith shown and described is to be taken as a preferred example of the same and that various changes in the shape, size and arrangement of parts may be resorted to without departing from the spirit of my invention or the scope of the subjoined claims.

Having thus described my invention I claim.

1. A spring device for exerting support on a vertically displaceable load comprising a frame, a first spring supported by said frame at one end, a first lever arm pivotally connected at one end to said frame and at the other end of the arm to a first longitudinal load bearing member, means pivotally connecting the other end of said first spring to said first lever arm between the ends of the arm, a second spring parallel to and adjacent said first spring but oppositely oriented relatively to said frame with respect to said first spring, said second spring being supported by said frame at one end, a second lever arm pivotally connected at one end to said frame and at the other end of the arm to a second longitudinal load bearing member, means pivotally connecting the other end of said second spring to said second lever arm between the ends of the arm, said first and second longitudinal load bearing members being coaxially oriented.

2. The combination of claim 1 in which the frame is substantially Z shaped and said first and second springs are compression springs.

3. The combination of claim 1 in which the frame is substantially I shaped and said first and second springs are tension springs.

References Cited in the file of this patent

UNITED STATES PATENTS

| Re. 24,050 | Rouverol | Aug. 9, 1955 |
| 2,161,334 | Carwardine | June 6, 1939 |
| 2,743,475 | McNerland | May 1, 1956 |

FOREIGN PATENTS

| 954,195 | France | June 6, 1949 |